No. 632,039. Patented Aug. 29, 1899.
J. B. BLOOD & F. A. MERRICK.
AUTOMATIC CONTROLLING SYSTEM FOR ELECTROMOTIVE DEVICES.
(Application filed July 11, 1898.)
(No Model.) 2 Sheets—Sheet 1.
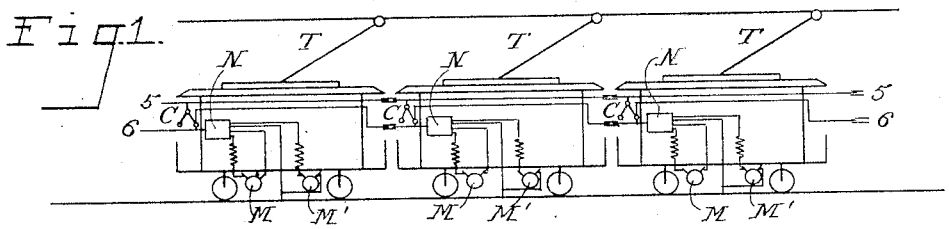
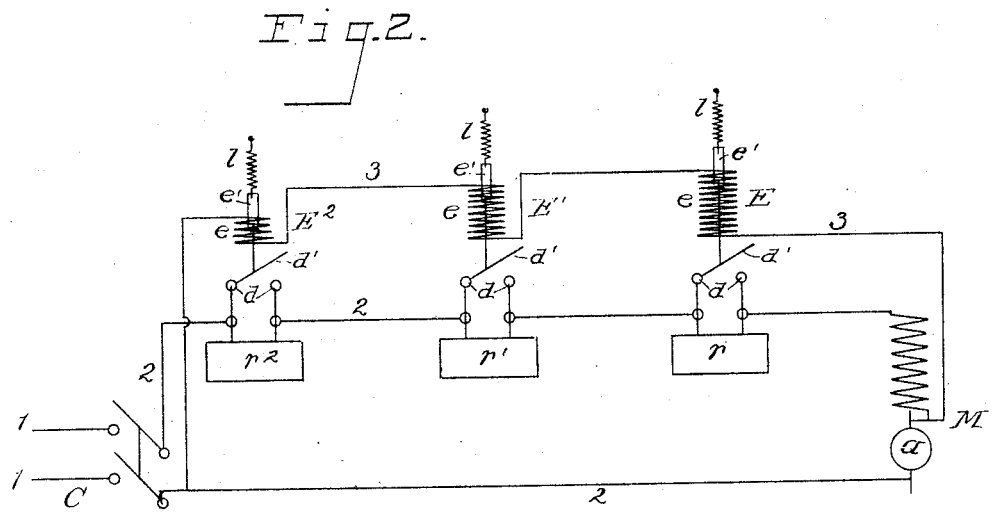

No. 632,039. Patented Aug. 29, 1899.
J. B. BLOOD & F. A. MERRICK.
AUTOMATIC CONTROLLING SYSTEM FOR ELECTROMOTIVE DEVICES.
(Application filed July 11, 1898.)

(No Model.) 2 Sheets—Sheet 2.

WITNESSES
INVENTORS
John Balch Blood and
Frank A. Merrick
BY
ATTORNEYS.

UNITED STATES PATENT OFFICE.

JOHN BALCH BLOOD, OF NEWBURYPORT, AND FRANK A. MERRICK, OF NEWTON, MASSACHUSETTS; SAID BLOOD ASSIGNOR OF HIS RIGHT AND SAID MERRICK ASSIGNOR OF TWO-THIRDS OF HIS RIGHT TO BLOOD & HALE, OF BOSTON, MASSACHUSETTS.

AUTOMATIC CONTROLLING SYSTEM FOR ELECTROMOTIVE DEVICES.

SPECIFICATION forming part of Letters Patent No. 632,039, dated August 29, 1899.

Application filed July 11, 1898. Serial No. 685,607. (No model.)

*To all whom it may concern:*

Be it known that we, JOHN BALCH BLOOD, residing at Newburyport, in the county of Essex, and FRANK A. MERRICK, residing at Newton, (Auburndale,) in the county of Middlesex, State of Massachusetts, citizens of the United States, have invented certain new and useful Improvements in Automatic Controlling Systems for Electric Motive Devices, of which the following is a specification.

This invention relates to improvements in automatic controlling systems for electric motive devices, and is especially applicable to the control of a plurality of motive equipments associated in an electrically-propelled train.

Our invention comprises means for controlling the acceleration effect on the motors, a set of such acceleration-controlling means being preferably provided for the motor or set of motors on each separate car or train unit, and means responsive to the speed of the motors for bringing such acceleration-controlling means into action, so that as soon as the motor reaches the speed to which any given adjustment of the controlling devices is adapted to bring it such controlling devices will be automatically shifted to further accelerate the motor to its next higher speed. Thus, the circuit having been closed to any number of motors so arranged, each motor or set of motors then passes under the control of its own automatic controlling device and is continually accelerated until the maximum speed attainable under the given conditions of load is reached or until the circuit is again broken by the operation, in which latter case all the controlling devices automatically return to position of lowest acceleration effect.

For operating the controllers in response to the speed of the motors we prefer to depend on the changes of counter electromotive force of the motors resulting from changes of speed thereof, and we therefore employ for this purpose electromagnetic devices responsive to such counter electromotive force—that is, to the electromotive force across the motor or armature terminals.

Figure 3:
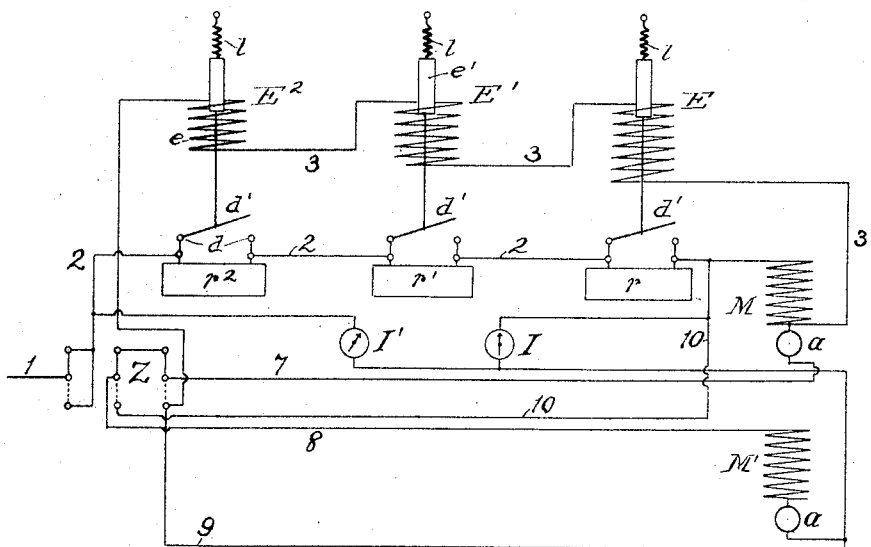
Figure 4:
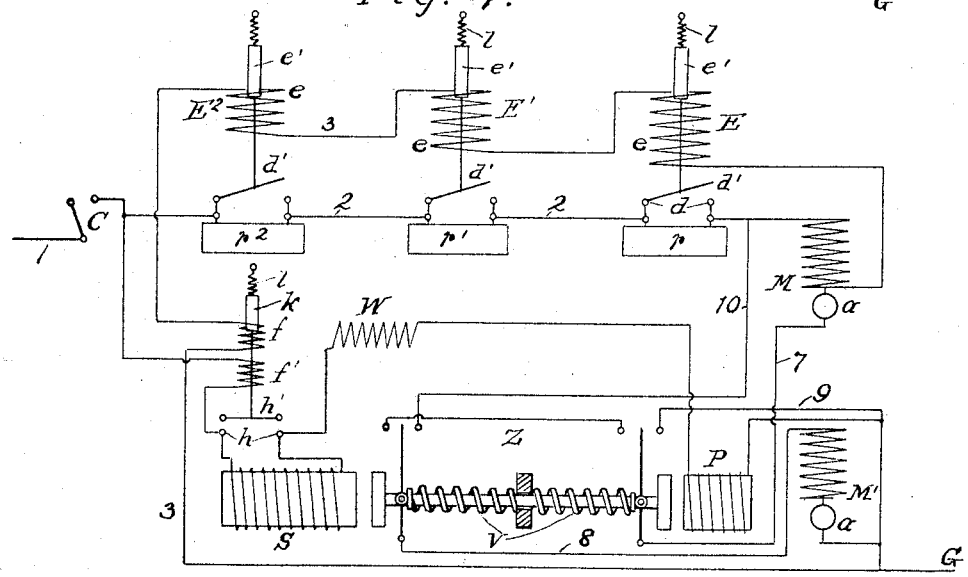

Referring to the accompanying drawings, which form a part of this specification, Figure 1 is a diagrammatic representation of a train of cars provided with our controlling system. Fig. 2 is a diagram showing the principle of operation of the invention, it being here applied only to the rheostatic control of the motors. Fig. 3 is a diagram showing the complete system of control for one car-unit, including a series parallel controlling device brought into operation under the direct control of the motorman or operator. Fig. 4 is a diagram showing a similar arrangement to Fig. 3 except that the series parallel control is an automatic function of the cycle of operation of the controller and requires no attention from the operator, this being therefore the complete development of the principle and being particularly adapted to the operation of a multiple-unit system of electric traction such as indicated in Fig. 1.

Referring now to Fig. 2, the motor M is shown connected permanently in series with resistance-boxes $r\ r'\ r^2$, and a switch C (shown at the left) is used to make and break the connection between the mains 1 1 from the supply source and the motor-circuit 2 2. The terminals from each resistance box or section are brought out to contacts $d$, so arranged as to be bridged or connected by a bar $d'$, which thus short-circuits the resistance, the respective switch-bars $d'$ for the several resistances being connected to and operated by the several electromagnetic devices E E' E². Each of such electromagnetic devices is shown as consisting of a solenoid or electromagnet $e$, acting on a core or armature $e'$, connected to switch-bar $d'$, to close the switch against the action of a spring 1. These electromagnets are connected in series with one another in a circuit 3, shunting the armature $a$ of the motor to be governed, as shown. Each magnet is wound with a different number of turns of wire, so that with a given current flowing through this magnet-circuit all magnets will be at a different point of excitation. By winding the magnet which operates the bar short-circuiting the resistance-section, say $r$, which it is desired to cut out first with the greatest number of turns, the second with a lesser number, and so on down to the last or in some equivalent manner, the magnets are arranged to come into action to operate the bars $d'$ and short-circuit the resistances $r'\, r^2\, r^3$ successively as the current through shunt 3 is increased.

When the switch C at the left is closed in one of its positions corresponding to the direction of armature rotation desired, a current flows through the resistance-boxes and motor limited in volume for the instant by only the ohmic resistance of this main circuit. Under the influence of this current the armature of the motor begins to rotate, thereby building up within itself a further bar to the passage of current in shape of a counter electromotive force, which increases with the speed of the armature. Meanwhile with the first flow of current through the stationary armature a difference of potential due only to the ohmic resistance of the armature is maintained across the ends of the magnet-circuit. As the armature rotates, however, and its counter electromotive force builds up the potential across the magnet-circuit increases, and consequently with it the current flowing through this circuit. When this current has reached the amount predetermined by the number of turns in its winding, the first magnet operates its short-circuiting bar, thus cutting the first section of resistance out of the main circuit. Previous to this reduction of resistance in the main circuit the current therein had fallen in value by reason of the armature counter electromotive force aforementioned; but with this reduction of resistance the main current is again augmented and the accelerating-force on the armature thus continued. The resulting increase of armature-speed still further builds up the counter electromotive force, which in turn forces a stronger current through the magnet-circuit until the magnet wound with the second largest number of turns operates to short-circuit the second resistance-section, and so on until all the resistances is short-circuited and the full electromotive force of source of supply is applied to the motor-terminals. On breaking the current in the main circuit by opening the main switch the current in the magnet-circuit ceases with the fall of counter electromotive force of the armature, and the springs carry the short-circuiting arms immediately out of contact with the resistance-terminals. Thus the cycle is complete and all is ready for another start whenever the main switch is closed.

As will be seen from the description, the device performs the function of an automatic acceleration-regulator and at the same time provides an efficient safeguard for the protection of the motor, since resistance is cut out of the main circuit only when and because armature counter electromotive force is increased to a proper prearranged amount. Of course any desired number of resistance-sections or any total amount of resistance desired may be used, all depending upon the smoothness and speed of acceleration desired.

Fig. 3 shows an arrangement for controlling two or more motors or groups of motors by what is commonly known as "series-parallel operations," in which, however, the act of changing connections of the motors from series to parallel is dependent upon the operator and is not an automatically-performed function, as is the case with short-circuiting of the resistance. The arrangement of the rheostatic-operating devices is the same as above described in connection with Fig. 2; but there are added series-parallel-controlling circuits and devices, Z being the series-parallel switch located in a position convenient to the operator and adapted to connect the two motors M M' in either series or parallel relation. A pressure-indicator I, connected across the terminals of the motors brought to a place convenient to the sight of the operator, gives him information as to amount of the counter electromotive force of the motor or motors, and thus enables him to throw the series-parallel switch Z at the proper time. This pressure-indicator may for the further information of the operator be supplemented by another pressure-indicator I', receiving at all times full impressed electromotive force of the lines from the source of supply. When the switch Z is thrown, the current through the motors and thereby also through the magnet-circuit is broken as the switch-contacts pass from the series to parallel position, and the springs carrying the short-circuiting bars out of contact with the resistance-terminals the resistance is brought into circuit ready to limit the current when the main switch-contacts fall into the parallel position. Further acceleration of the motors then operates to cut this resistance out in the same manner as before. In the series position of the switch Z (shown by full lines) the current passes through the main circuit 2, including one or more of the resistances $r\, r'\, r^2$, to motor M, and thence by wire 7 to switch Z, and by wire 8 to the other motor M' and ground at G. In the parallel position of this switch Z (indicated by dotted lines) the current passes from line 2 to both motors M and M', the branch through motor M leading by wire 7 to switch Z, and thence by wire 9 to ground G, and the other branch leading from line 2 by wire 10 to switch Z, and thence by wire 8 to motor M' and ground. The shunt-magnet circuit being so connected as to include the potential of both motors when they are in series and of a single motor when the motors are connected in multiple, the magnets act in substantially the same manner in both cases. In other words, they are actuated in both cases by a potential, which is the potential of the line less the drop in the resistance-boxes, as in the other cases described. The feature described in connection with Fig. 3 may or may not be retained, as is found desirable from the use to which the motors are put.

The main switch, as shown in Fig. 3, is combined with the series-parallel switch Z, which of course is a matter of option. If made as shown, the operation of the device would consist in throwing the switch into either series or parallel position, as desired, and allowing the motors to accelerate and cut out resistance automatically. If the start had been made in series, as would be the common practice, the switch would be thrown over to parallel by the operator after all resistance had been cut out, as shown by the potential indicators before mentioned. If the main switch were separate from the series-parallel switch, either could be used to start or stop the motors provided the series-parallel switch had an intermediate position in which the circuit through the motors was broken, or in this case, if desired, the so-called "main" switch could be dispensed with and motors operated entirely by the series-parallel switch.

Fig. 4 shows, essentially, the same arrangement as that in Fig. 3, with the exception that the series-parallel switch instead of being thrown by the operator is actuated automatically at the proper time in the cycle of operations of the controller, its actuation, like that of the cut-outs, being a function of the rise in voltage across the terminals of the shunt-circuit previously described. This shunt-circuit to facilitate the operation of the series-parallel switch may be connected, as shown, so as to include in the series position the potential across one motor and the armature only of the other motor, or, in other words, to exclude from the pressure at the terminals across this shunt-circuit the ohmic drop in one field-spool in case motors with a series-winding are used. This arrangement allows of adjustment of the series-parallel-switch magnets, (to be hereinafter described,) so that throwing of this switch will be somewhat delayed relative to the time of short-circuiting the last resistance-section, and that therefore the current flowing through the main circuit may at the time of operation of the switch be reduced from the maximum value consequent on this short circuiting. In this shunt-circuit, in addition to the resistance cut-out magnets $e$ and in series with them, is connected another magnet $f$, the series-parallel-switch magnet, which when main current has fallen sufficiently after short-circuiting of last resistance-step, as mentioned above, then becomes enough excited by reason of the consequently increased current flowing through the shunt-circuit to attract its armature or core $k$ and so short-circuit the terminals $h$ of a magnet S, which is then holding the series-parallel switch Z in the series position. The latter magnet S is in series with another magnet P for pulling the series-parallel switch into the parallel position at the proper time and, together with magnet P, is connected in shunt across both the resistance and the motors, thus receiving full potential of the lines at all times when the main switch is closed. In this same circuit and in series with the two magnets just mentioned is connected a subsidiary winding $f'$ on the series-parallel-switch magnet $f$ before described. This winding without the full maximum current in the main winding of this magnet is insufficient to operate the same; but when by joint excitation of the two windings the magnet has attracted its armature the subsidiary winding $f'$ is sufficient to hold the armature in place. The magnet S for holding the series-parallel switch in series position at same excitation and with switch in its "off" position, and thus armatures of the two magnets in position equally remote, exerts a more powerful pull through its core or armature on the switch-contacts than the magnet P. At the same time, however, when switch-contacts are in parallel position and both magnets are equally excited the magnet S is not powerful enough to bring the contacts to the series position by reason of the increased air-gap at such magnet S and the decreased air-gap at the magnet P. When the main switch is open, the series-parallel-switch contacts are out of contact with each other and the switch stands in its "off" position, brought to and held in that position by reason of springs V, as shown. The series-parallel switch being in this "off" position, the circuit is interrupted through the main circuit irrespective of the position of the main-switch contacts. The several circuits are numbered as in Fig. 3.

The operation of the controller is as follows: On closing the main switch C the series-parallel switch being in "off" position, as described, no current flows through the main circuit, but a current flows in the shunt-circuit, which is placed across this total main circuit of resistance and motors. This current passes through the subsidiary winding $f'$ of the series-parallel-switch magnet through the winding of the series-position magnet S and through that of the parallel-position magnet P. The subsidiary excitation of the series-parallel-switch magnet is, as explained, insufficient to produce any motion of its armature. The magnet S being, as before noted, more powerful than magnet P under the same exciting-current, the armature of S is drawn up and contacts of the series-parallel switch brought into series position against the force of the spring on that side, thus closing the main circuit and a current flows through the motors, &c., accelerating the armatures and cutting out the resistance in circuit, all as described, until the last resistance-section has been short-circuited. As the current finally decreases in the main circuit after the last resistance-section is short-circuited the potential across the shunt which is around the motor and the armature of the other increases, due to decrease of current and therefore of ohmic drop in the series-field winding of the motor, whose armature only is included between terminals on this shunt. With the increase of current in the shunt-circuit the series-parallel-switch magnet becomes sufficiently energized to draw up its armature and so short-circuit the winding of the series-position magnet S. To accomplish this latter purpose, terminals $h$ are brought out from the magnet S, and the short-circuiting thereof is attained by bringing metal bar or other conductor $h'$ across these terminals in every respect similarly to the short-circuiting of a resistance-section before described, the operation of this series-parallel-switch magnet being in this respect identical with that of the resistance-short-circuiting magnets. Upon the short-circuiting of this magnet S the spring on this side, which has been compressed, at once returns the series-parallel-switch contacts to the "off" position, at the same time the parallel-position magnet P, acting on its armature, continues the movement of the contacts to the parallel position against pressure of the spring on that side. Incidentally the magnet P is helped in this operation, inasmuch as by short-circuiting of magnet S the current through this outside shunt-circuit is increased. Meanwhile as the switch-contacts passed through the "off" position the main current has been interrupted and also, therefore, the current in the shunt across the motors. This has resulted in removing the short-circuiting bars from contact with the resistance-section terminals, all as and for purpose before described in previous case; but the short-circuiting bar has not fallen back from contact with terminals of series-position magnets S nevertheless because of the subsidiary winding before mentioned on the series-parallel-switch magnet, which subsidiary winding has been continuously energized by its connection in series in the long shunt. In fact, this winding, like that of magnet P, has received the extra assistance at the critical time by short-circuiting of winding of magnet S. The series-parallel switch being now in the parallel position and all resistance included in motor-circuit-armature acceleration continues cutting out all resistance and placing full potential of the lines across the motors in this connection, all as described in preceding case. Upon opening of the main switch current is thereby discontinued through both the shunt-circuits. The series-parallel switch returns to its "off" position, the short-circuit bar is removed from the series-position magnet S, also those from the resistance-sections, and everything is ready for a renewal of the cycle on again closing the main switch.

W represents a blow-out magnet for the several controlling-contacts, which magnet may be connected in series with magnets S and P, as shown.

Provided no series winding existed on the motor-fields the operation of the controlling device would not be interfered with, except that an additional hardship would be put upon the arc-breaking contacts of the series-parallel switch due to their operation while a heavier current was passing, as the series-parallel-switch magnet would naturally operate at the time of short-circuiting the last resistance-section. If desired, a mechanical arrangement could be made to delay the operation of this series-parallel-switch magnet until the elapse of a specified time after short-circuiting of last resistance-section.

As previously stated, the entirely automatic operation of the device on closing the main switch renders it particularly applicable to control of a "multiple-unit system" of electric traction. Such application is illustrated in Fig. 1, where, as shown, there is a connection of the trolley or current-collecting device T on each vehicle to a conductor 5, running the length of the vehicle. Another conductor 6, also running the length of the vehicle, is connected to the motor or motors on said vehicle in the usual manner by means of the controlling devices hereinbefore described. On each car one or more switches can be so arranged that in the closed position of any one of them it would connect these two conductors together, when the motors would automatically control themselves, as described. This makes the equipment of each individual car a complete operative unit. Each car being so equipped it remains only to connect the conductors from one car to like conductor, respectively, of the next car, and so on throughout the length of the train, forming one conductor running the length of the train connecting the current-collecting devices of the various cars and another conductor running the length of the train connecting all the motor-supply circuits of the various cars. Then on closing a switch-making connection between these two conductors on any car the motors on each car will be started and controlled automatically in every respect similarly to case in which a single car is operated. In Fig. 1, N represents the complete controlling-unit, including the rheostat, and series-parallel devices and the means for their automatic operation.

For reversing the motors a separate circuit could be employed which might profitably be made to include on each car a magnet with proper resistance for limiting the current to the desired minimum for economical operation. A common form of reversing-switch being used a spring could be employed to hold the reverse-switch contacts in such relation as would correspond with forward rotation of the armatures, no current flowing through the reversing-magnets, in which case, as by reason of the corresponding position of reverse handle, no connection would be made between conductor connected to current-collecting device and conductor connected to reversing-magnet terminals. By throwing reversing-handle to reverse position current would flow between these conductors and through reversing-magnets, energizing same and causing them to draw switch-contacts to reverse position against force of spring before mentioned and hold them there as long as handle remained in reverse position. On returning handle to forward position current in magnet would be broken and spring would return switch-contacts to forward connection. This for a single car, and by connecting together from car to car the conductors which supply the reversing-magnets on each car and providing on each car a switch connecting the current-collecting devices, said switch operated from the reversing-handle when latter is moved to reverse position, a method is had for reversing the motors on each and every car of the train by throwing of a reversing-lever on any desired car of the train. The main switch and reversing-handle may be interlocked, if desired, to subserve the same purpose as interlocking, reversing, and controlling handle of the ordinary electric-car controller of present commercial use.

We have disclosed our invention with especial reference to the utilization of the speed or the electromotive force as the controlling factor that determines the operation of the acceleration-controlling means. In its broad sense, however, the invention is not limited to such an embodiment, but includes the use of any of the electric functions of the electromotive devices, such as current or other electric or magnetic conditions of the motor or motor-circuit. The invention provides means whereby the attainment of a given electric condition by the electromotive device brings into operation a controlling device to further control the electromotive device to bring it into the next succeeding condition.

Having thus described our invention, what we claim as new therein, and desire to secure by Letters Patent, is—

1. The combination with an electric-supply circuit, an electromotive device connected thereto through a connection including a switch and a plurality of resistances, of a plurality of electromagnetic switching devices connected in shunt with said electromotive device and responding to successive increments of electromotive force therein to successively short-circuit said resistances.

2. The combination with an electric-supply circuit, an electromotive device connected thereto through a connection including a switch and a plurality of resistances, of short-circuiting switches for said resistances and a plurality of electromagnetic devices having coils with different number of turns, connected in series in a shunt around the electromotive device and respectively controlling said switches.

3. The combination with an electric-supply circuit, of a plurality of electromotive devices connected with such circuit through a switch, and each provided with an electromagnetically-controlled acceleration-controller energized by a shunt around the electromotive device and accelerating means acting in response to definite increase of speed in such motive devices to produce circuit conditions leading to further increase of speed.

4. The combination with an electric-supply circuit, of a plurality of electromotive devices connected with such circuit through a switch, and a plurality of resistances, and each provided with an acceleration-controller comprising in a shunt around same a series of electromagnetic switching devices of different sensitiveness for short-circuiting the respective resistances, successively in response to successively-increasing counter electromotive force of the electromotive device.

5. The combination with a plurality of electromotive devices, each provided with an acceleration-controlling means, of means responsive to definite increase of speed of each electromotive device to produce a circuit condition leading to further increase of speed, and means for closing and opening the circuit of all such electromotive devices simultaneously.

6. The combination with a plurality of electromotive devices of a switch for placing same in series or parallel relation, and means comprising an electromagnet in shunt with said electromotive devices responding to a definite counter electromotive force of the electromotive devices to throw said switch from series to parallel relation.

7. The combination with an electromotive device, of means for controlling the acceleration thereof, and an electromagnetic device operatively connected to such acceleration-controlling means, and comprising two coils acting in the same direction on such controlling means, one of such coils being connected in shunt with the electromotive device, but in series with the controlling means, and the other being connected in shunt with both the electromotive device and its controlling means.

8. The combination with a plurality of electromotive devices, of acceleration-controlling means for each of same, and a plurality of electromagnetic devices operating the respective acceleration-controlling means, each electromagnetic device comprising an energizing-coil in shunt with the electromotor device but in series with its controlling means and an auxiliary coil in shunt with both the electromotive device and its controlling means.

9. The combination with a plurality of cars with independent electromotive-car equipments, of an acceleration-controller for each equipment, means responsive to definite speed of the electromotive devices to control the movement of the corresponding acceleration-controller to produce further increase of speed, a supply-circuit, and means for connecting said supply-circuit to all of said electromotive and controlling devices simultaneously.

10. The combination with an electrically-propelled train comprising a plurality of independent electromotive-car equipments, a supply-wire running through the train and having connection to a source of electric supply, a wire leading to the electromotive devices of each equipment, and having switches on different cars for connecting it to the supply-wire, and a plurality of independent acceleration-controlling devices for the respective equipments and means for controlling same in response to definite increase counter electromotive force of the electromotive devices of the respective equipments to produce a further acceleration thereof.

11. The combination with an electrically-propelled train comprising a plurality of electromotive-car equipments, of which each is provided with a rheostatic and a series-parallel-controlling device, of a plurality of speed-responsive devices acting on increase of speed of the electromotive devices to successively cut out the rheostatic resistance, while the electromotive devices are in series relation, and to then transfer said devices to parallel relation, reinserting such resistance to finally cut out said resistance, in response to successive increments of speed, substantially as set forth.

12. The combination with an electrically-propelled train comprising a plurality of electromotive-car equipments, each provided with a rheostatic and a series-parallel-controlling means, of devices in each equipment responding to definite successive increments of counter electromotive force in the electromotive devices thereof to successively cut out the rheostatic resistance while the motive devices are in series relation, then put said devices in parallel relation with resistances reinserted, and finally cut out said resistances, substantially as set forth.

13. The combination with an electrically-propelled train comprising a plurality of electromotive-car equipments, each provided with a rheostatic and a series-parallel-controlling means, of devices in each equipment responding to definite successive increments of counter electromotive force in the electromotive devices thereof to successively cut out the rheostatic resistance while the motive devices are in series relation, then put said devices in parallel relation with resistances reinserted, and finally cut out said resistances, a circuit running through the train and connecting with said electromotive and controlling devices, a supply-circuit running through the train and connecting with a source of electrical energy and a switch on one or more of the equipments for closing the connection between the two circuits, substantially as set forth.

14. The combination with two electromotive devices, a switch for connecting same in series or parallel relation, a magnet pulling said switch toward the parallel position, a stronger magnet pulling said switch toward series position, these magnets being in series in a shunt around the electromotive devices, and electrically-operated means for short-circuiting the stronger magnet aforesaid, substantially as and for the purpose set forth.

15. The combination with two electromotive devices and a switch for connecting same in series or parallel relation, of two electromagnetic devices of unequal strength acting oppositely on said switch, means such as springs for moving said switch toward a central position, and means for short-circuiting the stronger of the aforesaid magnets.

16. The combination with a plurality of electromotive devices, rheostatic and series-parallel-controlling devices for same, electromagnetic devices in shunt with the electromotive devices, and acting on a definite increase of electromotive force to close and operate the series-parallel switch from series to parallel position and during such change to break the circuit, and an electromagnetic controlling device connected in shunt around the electromotive device and controlling the rheostatic device to cut out the resistance as the counter electromotive force of such motive devices increases.

JOHN BALCH BLOOD.
FRANK A. MERRICK.

Witnesses as to J. B. Blood:
  M. V. BIDGOOD,
  A. P. KNIGHT.
Witnesses as to Frank A. Merrick:
  H. W. SMITH,
  JOHN H. KENNEDY.